US009488877B2

(12) United States Patent
Wu (10) Patent No.: US 9,488,877 B2
(45) Date of Patent: Nov. 8, 2016

(54) ELECTRICALLY-DRIVEN LIQUID CRYSTAL LENS, DISPLAY DEVICE AND 3D LIQUID CRYSTAL DISPLAY METHOD

(71) Applicant: BOE TECHNOLOGY GROUP CO., LTD., Beijing (CN)

(72) Inventor: Kun Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 290 days.

(21) Appl. No.: 14/353,196

(22) PCT Filed: Dec. 12, 2013

(86) PCT No.: PCT/CN2013/089307
§ 371 (c)(1),
(2) Date: Apr. 21, 2014

(87) PCT Pub. No.: WO2015/035726
PCT Pub. Date: Mar. 19, 2015

(65) Prior Publication Data
US 2015/0077669 A1    Mar. 19, 2015

(30) Foreign Application Priority Data

Sep. 13, 2013  (CN) .......................... 2013 1 0419146

(51) Int. Cl.
*G02F 1/13* (2006.01)
*G02F 1/1335* (2006.01)
*G02F 1/1343* (2006.01)
*G02B 27/22* (2006.01)
*G02F 1/1333* (2006.01)
*G02F 1/1337* (2006.01)
*G02F 1/29* (2006.01)

(52) U.S. Cl.
CPC ......... *G02F 1/134309* (2013.01); *G02B 27/22* (2013.01); *G02B 27/2214* (2013.01);
(Continued)

(58) Field of Classification Search
CPC .................................................. G02F 1/133526
USPC ........................................................... 349/200
See application file for complete search history.

(56) References Cited

U.S. PATENT DOCUMENTS

| 2011/0149018 | A1 | 6/2011 | Kroll et al. |
| 2012/0218490 | A1* | 8/2012 | Takama ................. G02B 3/005 349/57 |
| 2014/0063381 | A1 | 3/2014 | Zhang et al. |

FOREIGN PATENT DOCUMENTS

| CN | 102207657 A | 10/2011 |
| CN | 102629009 A | 8/2012 |

(Continued)

OTHER PUBLICATIONS

Chinese Office Action of Chinese Application No. 201310419146.5 with English translation, mailed Aug. 20, 2014.
(Continued)

*Primary Examiner* — Wen-Ying P Chen
(74) *Attorney, Agent, or Firm* — Collard & Roe, P.C.

(57) ABSTRACT

An embodiment of the present invention relates to an electrically-driven liquid crystal (LC) lens, which comprises: first electrodes, an electrode group arranged corresponding to each sub-pixel, and a liquid crystal layer disposed between the first electrodes and the electrode groups. Each electrode group includes a plurality of second electrodes; and where the voltages of the second electrodes in each electrode group are progressively increased or decreased from left to right sequentially, light passing through the sub-pixels is deflected to different directions. The electrically-driven LC lens can improve the resolution of 3D liquid crystal display. The embodiment of the present invention further discloses a display device and a 3D display method.

18 Claims, 6 Drawing Sheets

(52) U.S. Cl.
CPC ....... *G02F1/1337* (2013.01); *G02F 1/133345* (2013.01); *G02F 1/133512* (2013.01); *G02F 1/29* (2013.01); *G02F 1/1343* (2013.01); *G02F 2001/134345* (2013.01); *G02F 2001/291* (2013.01); *G02F 2001/294* (2013.01)

(56) References Cited

FOREIGN PATENT DOCUMENTS

| CN | 202533687 | U | 11/2012 |
| CN | 202600323 | A | 12/2012 |
| CN | 103149767 | A | 6/2013 |
| CN | 203480184 | U | 3/2014 |

OTHER PUBLICATIONS

English Translation of the International Search Report of PCT/CN2013/089307 published in English on Mar. 19, 2015.

International Search Report, International Preliminary Report on Patentability and Written Opinion of the International Searching Authority of PCT/CN2013/089307 in Chinese, mailed Jun. 27, 2014.

Chinese Office Action of Chinese Application No. 201310419146.5, mailed Jun. 16, 2014.

English translation of the International Preliminary Report on Patentability and Written Opinion of the International Searching Authority of PCT/CN2013/089307, issued Mar. 15, 2016.

* cited by examiner

FIG. 1 (PriorArt)

| Driving the voltages of second electrodes in an electrode group of each sub-pixel of the electrically-driven LC lens to be progressively increased from left to right sequentially when the first setting is switched, and displaying a left-eye image in each sub-pixel of the display panel | 701 |

↓

| Driving the voltages of second electrodes in the electrode group of each sub-pixel of the electrically-driven LC lens to be progressively decreased from left to right sequentially when the second setting is switched, and displaying a right-eye image in each sub-pixel of the display panel | 702 |

FIG. 7

ELECTRICALLY-DRIVEN LIQUID CRYSTAL LENS, DISPLAY DEVICE AND 3D LIQUID CRYSTAL DISPLAY METHOD

CROSS REFERENCE TO RELATED APPLICATIONS

This application is the National Stage of PCT/CN2013/089307 filed on Dec. 12, 2013, which claims priority under 35 U.S.C. §119 of Chinese Application No. 201310419146.5 filed on Sep. 13, 2013, the disclosure of which is incorporated by reference. The international application under PCT article 21(2) was not published in English.

TECHNICAL FIELD

Embodiments of the present invention relate to an electrically-driven liquid crystal (LC) lens, a display device and a three-dimensional (3D) liquid crystal display method.

BACKGROUND

Currently, electrically-driven LC lens can be adopted for realizing 3D liquid crystal display. In general, a single electrically-driven LC lens may be adopted to cover two or more sub-pixels to display a 3D image.

Figure 1:
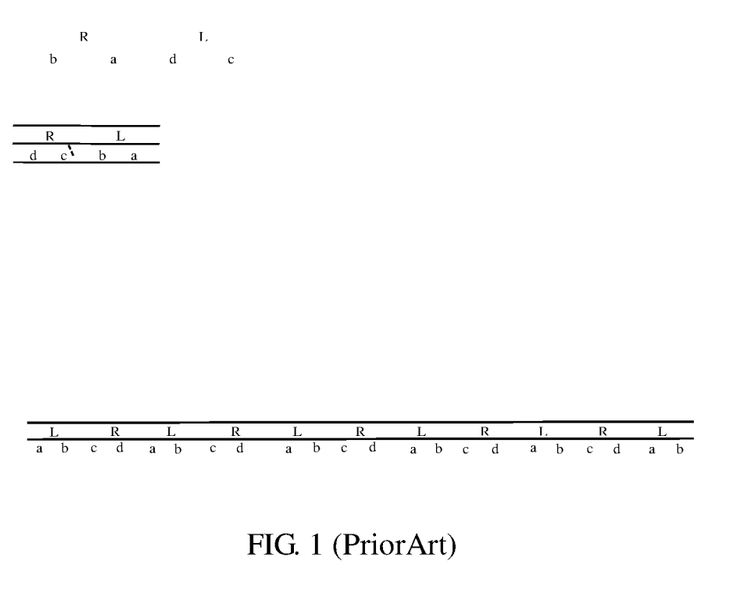
FIG. 1 is a schematic diagram illustrating the process of 3D liquid crystal display by an electrically-driven LC lens in the prior art.

In the case where 3D liquid crystal display is realized in the aforesaid way, as illustrated in FIG. 1, different pixels are respectively used to display a left-eye image and a right-eye image at the same moment; the left-eye image and the right-eye image are respectively refracted to a left eye and a right eye by the electrically-driven LC lens so that the left eye and the right eye can watch different images; and hence the effect of 3D liquid crystal display can be achieved. However, in the case where 3D liquid crystal display is realized in this way, the resolution of the images viewed by the left eye and the right eye is ½ of the resolution of a display device, and hence the resolution of 3D liquid crystal display is reduced.

SUMMARY

Embodiments of the present invention provide an electrically-driven LC lens, a display device and a 3D liquid crystal display method for improving the resolution of 3D liquid crystal display.

One embodiment of the present invention provides an electrically-driven LC lens, which comprises: first electrodes, a plurality of electrode groups arranged corresponding to respective sub-pixels, and a liquid crystal layer disposed between the electrodes and the electrode groups, wherein each electrode group includes a plurality of second electrodes; and where the voltages of the second electrodes in each electrode group are progressively increased or decreased from left to right sequentially, light passing through corresponding sub-pixels is deflected to different directions.

For instance, in the electrically-driven LC lens, the plurality of second electrodes in each electrode group are strip electrodes which are parallel to each other and sequentially arranged from left to right.

For instance, in the electrically-driven LC lens, each electrode group may include 2 to 30 strip electrodes. For instance, in each electrode group, the widths of the strip electrodes are equal. For instance, in each electrode group, the spacing between the strip electrodes is equal. For instance, the space between adjacent electrode groups is less than or equal to a predetermined value.

For instance, in the electrically-driven LC lens, the liquid crystal layer includes: an upper alignment layer, a lower alignment layer and liquid crystals filled between the upper alignment layer and the lower alignment layer; the first electrodes are disposed in the upper alignment layer; and the electrode groups are disposed in the lower alignment layer. For instance, adjacent electrode groups are respectively disposed in different layers.

For instance, the electrically-driven LC lens may further comprise: a transparent insulating layer disposed beneath the lower alignment layer; and adjacent electrode groups are respectively disposed in the lower alignment layer and the transparent insulating layer.

For instance, the thickness of the transparent insulating layer may be 0.5 to 10 micrometers. Preferably, the thickness of the transparent insulating layer is 1 to 3 micrometers.

For instance, a high-impedance layer material is filled into spacing in each electrode group except the stripe electrodes to form a high-impedance layer. For instance, the width of the high-impedance layer is greater than or equal to the width of the sub-pixel.

Another embodiment of the present invention further provides a display device, which comprises the electrically-driven LC lens provided by the embodiment of the present invention and a display panel. The sub-pixels of the electrically-driven LC lens correspond to sub-pixels of the display panel.

For instance, in the display device, the spacing between adjacent electrode groups in each sub-pixel of the electrically-driven LC lens is less than or equal to the width of a black matrix between each sub-pixel in the display panel.

Still another embodiment of the present invention further provides a 3D display method employing the display device provided by the embodiment of the present invention, which comprises: driving the voltages of second electrodes in an electrode group of each sub-pixel of the electrically-driven LC lens to be progressively increased from left to right sequentially when the first setting is switched, and displaying a left-eye image in each sub-pixel of the display panel; and driving the voltages of second electrodes in an electrode group of each sub-pixel of the electrically-driven LC lens to be progressively decreased from left to right sequentially when the second setting is switched, and displaying a right-eye image in each sub-pixel of the display panel, wherein the switching frequency of the first setting and the second setting is greater than or equal to a set value.

Embodiments of the present invention provide an electrically-driven LC lens, a display device and a 3D liquid crystal display method. Where the voltages of second electrodes in an electrode group of each sub-pixel of the electrically-driven LC lens is progressively increased or decreased from left to right sequentially, light passing through corresponding sub-pixels is deflected to different directions, and hence corresponding sub-pixels of a display panel can be respectively viewed by a left eye or a right eye of a user. In this case, a left-eye image and a right-eye image are alternately displayed, namely the left eye and the right eye can respectively view images without reduced resolution at different moments, and hence the resolution of 3D liquid crystal display can be improved.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

Reference numerals: 101: sub-pixel; 102: BM; 103: substrate; 201: upper alignment layer; 202: lower alignment layer; 203: liquid crystal; 204: first electrode; 205: electrode group; 2051: second electrode; 2052: high-impedance layer; 206: transparent insulating layer.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Embodiments of the present invention provide an electrically-driven LC lens, a 3D display device and a 3D liquid crystal display method. In the electrically-driven LC lens, an electrode group is arranged corresponding to each sub-pixel and arranged opposite to a first electrode, and each electrode group includes a plurality of second electrodes; and when the voltages of the second electrodes in the electrode group of each sub-pixel are progressively increased or decreased from left to right sequentially, light passing through the corresponding sub-pixels is deflected to different directions, and hence the sub-pixel is respectively viewed by the left eye or the right eye of a user. In the 3D display device, a left-eye image and a right-eye image are alternately displayed, namely the left eye and the right eye can respectively watch images without reduced resolution at different moments, so that the resolution of the 3D display device can be improved.

Embodiment 1

Figure 2A:
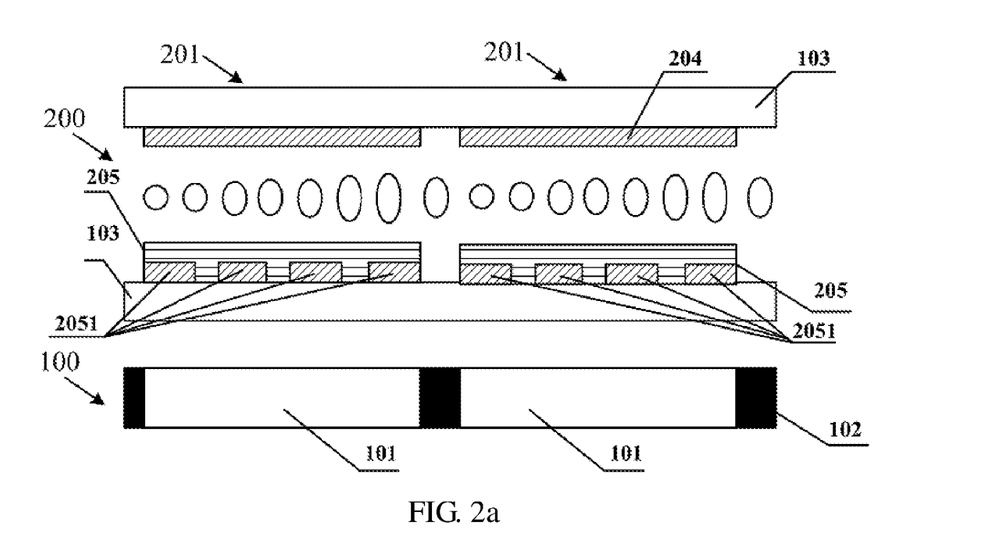
FIG. 2a is a first schematic structural view of an electrically-driven LC lens provided by an embodiment of the present invention.

As illustrated in FIG. 2a, an electrically-driven LC lens 200 provided by the embodiment of the present invention may be disposed on a light-emitting side of a display panel 100 so as to cooperate with the display panel 100 to obtain a 3D display device. The electrically-driven LC lens 200 comprises: first electrodes 204, electrode groups 205 disposed in each sub-pixel 201, and a liquid crystal layer disposed between the electrodes 204 and the electrode groups 205. Each sub-pixel 201 of the pixel array of the electrically-driven LC lens 200 corresponds to each sub-pixel 101 of the pixel array of the display panel 100. FIG. 2a illustrates two sub-pixels 201 and the corresponding sub-pixels 101.

Each electrode group 205 includes a plurality of second electrodes 2051; and when the voltages of the second electrodes 2051 in each electrode group 205 are progressively increased or decreased from left to right sequentially, light emitted by the corresponding sub-pixels 101 is deflected to different directions, and the sub-pixels 101 are respectively viewed by the left eye or the right eye of a user.

The first electrodes 204 and the second electrodes 2051 may be respectively disposed on the corresponding substrates 103.

When the voltages of the second electrodes 2051 in each electrode group 205 are progressively increased from left to right sequentially, liquid crystal molecules at respective positions are deflected to different angles due to the different driving voltages, and hence different phase retardations can be produced; and light emitted from the sub-pixels 101 of the display panel 100 will be deflected correspondingly after passing through corresponding sub-pixels 201 of the electrically-driven LC lens 200, and hence the left eye of the user can view a left-eye image displayed at this point.

Similarly, when the voltages of the second electrodes 2051 in each electrode group are progressively decreased from left to right sequentially, the liquid crystal molecules at respectively positions are deflected to different angles due to different driving voltages, and hence different phase retardations can be produced; and light emitted from the sub-pixels 101 of the display panel 100 will be deflected correspondingly after passing through corresponding sub-pixels 201 of the electrically-driven LC lens 200, and hence the right eye of the user can view a right-eye image displayed at this point.

Embodiment 2

As the voltages of the second electrodes 2051 are progressively increased or decreased from left to right sequentially in practice, in order to reduce the production complexity of the electrically-driven LC lens, the second electrodes 2051 may be strip electrodes sequentially arranged from left to right. For instance, for facilitating the voltage setting and better phase retardation effect, the strip electrodes are parallel to each other.

Therefore, on the basis of the embodiment 1, in the present embodiment, the second electrodes 2051 are set to be strip-shaped, and meanwhile the strip electrodes are parallel to each other and sequentially arranged from left to right, for easing production process and voltage setting.

Embodiment 3

On the basis of the embodiment 1, the number of the strip electrodes in each electrode group 205 is generally less than or equal to 30. In this case, the phase retardation effect is uniform and the production complexity is low. If the number of the strip electrodes in each electrode group 205 is larger, the phase retardation effect may be better but the production complexity can be increased. Therefore, in general, each electrode group 205 may include 2 to 30 strip electrodes. Preferably, generally where each electrode group 205 includes 4 to 7 strip electrodes, the phase retardation effect can satisfy the requirement and the production complexity can be low.

Embodiment 4

On the basis of the embodiment 1, in order to conveniently set the voltages of the strip electrodes 2051 and achieve a better phase retardation effect, the widths of the strip electrodes in each electrode group 205 are equal. When the widths of the strip electrodes are equal to each other, in the case of voltage setting of each strip electrode, the calculation method is same, which brings the convenience for voltage setting, and in the case of reasonable voltage setting, the phase retardation effect is better.

Embodiment 5

On the basis of the embodiment 1, in order to achieve more uniform phase retardation effect and more conveniently set the voltages of the strip electrodes 2051, the spacing between the strip electrodes in each electrode group 205 is equal. When the spacing between the strip electrodes is equal, the range of influence of each strip electrode is same and the electric field between the strip electrodes is more regular, which brings convenience for voltage setting, and in the case of reasonable voltage setting, the phase retardation effect is better.

Embodiment 6

On the basis of the embodiment 1, in order to avoid 3D display crosstalk in the case of a large spacing between the electrode groups 205, as illustrated in FIG. 2a, the spacing between adjacent electrode groups 205 is less than or equal to a predetermined value, for instance, less than or equal to the width of the black matrix 102 between the sub-pixels 101 of the display panel 100. In this case, when a left-eye image is displayed, the right eye cannot view the left-eye image through the spacing between the electrode groups 205; and correspondingly, when a right-eye image is displayed, the left eye cannot view the right-eye image through the spacing between the electrode groups 205. Therefore, the problem of 3D display crosstalk can be avoided.

The principle of "parallax type 3D display" is to use the principle of binocular parallax to allow the left eye and the right eye of a viewer to respectively watch the left-eye image and the right-eye image of a 3D image, hence producing 3D feeling. Therefore, the image to be viewed by the left eye cannot be viewed by the right eye, and vice versa. If the image to be viewed by the left eye is viewed by the right eye as well and vice versa, the problem of 3D display crosstalk can be incurred.

Embodiment 7

Figure 2B:
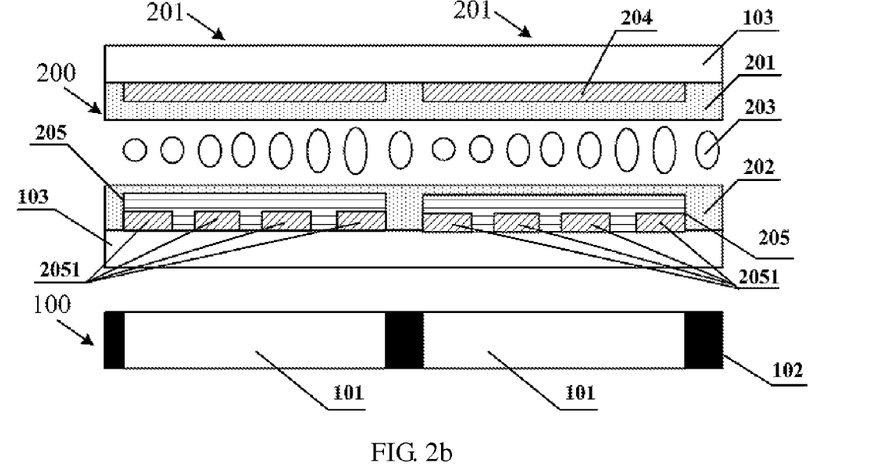
FIG. 2b is a second schematic structural view of the electrically-driven LC lens provided by an embodiment of the present invention.

As illustrated in FIG. 2b, the electrically-driven LC lens 200 provided by the present embodiment of the present invention comprises: liquid crystal 203 disposed between an upper alignment layer 201 and a lower alignment layer 202, first electrodes 204 disposed in the upper alignment layer 201, and a plurality of electrode groups 205 disposed in the lower alignment layer 202 and arranged corresponding to each of the sub-pixels 101 of a display panel 100. Each electrode group 205 includes a plurality of second electrodes 2051. The second electrodes 2051 are parallel to each other and sequentially arranged from left to right, so that corresponding sub-pixels can be respectively viewed by the left eye or the right eye of the user when the voltages of the second electrodes 2051 in each electrode group 205 are progressively increased or decreased from left to right sequentially.

In the embodiment, on the basis of the embodiment 1, the liquid crystal layer includes: the upper alignment layer 201, the lower alignment layer 202 and the liquid crystal 203 filled between the upper alignment layer 201 and the lower alignment layer 202. The first electrodes 204 are disposed in the upper alignment layer 201 and the electrode groups 205 are disposed in the lower alignment layer 202.

Embodiment 8

On the basis of the embodiment 1, adjacent electrode groups 205 may be further arranged in different layers so as to weaken the transverse electric field between adjacent electrodes and hence reduce 3D display crosstalk.

Embodiment 9

Figure 3:
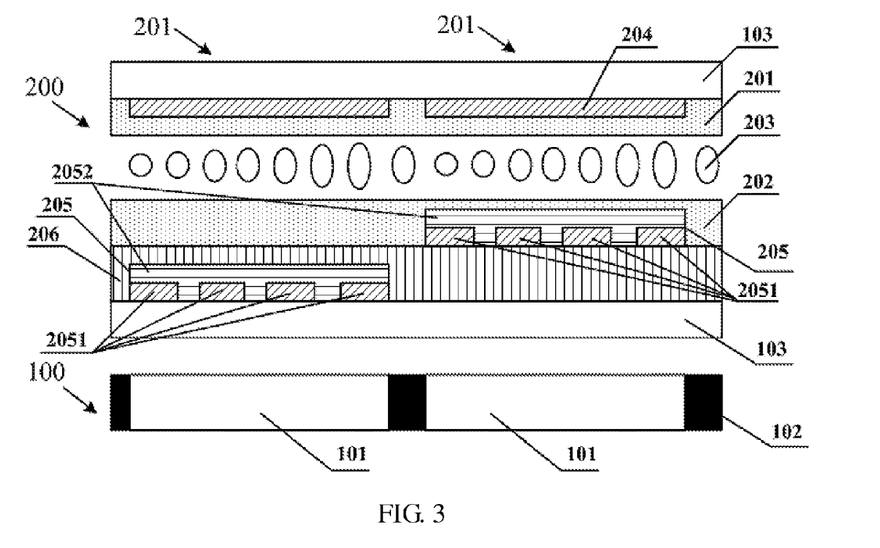
FIG. 3 is a preferred schematic structural view of the electrically-driven LC lens provided by an embodiment of the present invention.

On the basis of the embodiment 8, as illustrated in FIG. 3, the electrically-driven LC lens 200 may further comprise a transparent insulating layer 206 disposed beneath the lower alignment layer 202; and adjacent electrode groups 205 are respectively disposed in the lower alignment layer 202 and the transparent insulating layer 206. Therefore, the transverse electric field between adjacent electrodes can be further weakened, and hence the problem of 3D display crosstalk can be reduced.

The thickness of the transparent insulating layer 206 may be set to be 0.5 to 10 micrometers. Preferably, the thickness of the transparent insulating layer 206 is 1 to 3 micrometers. Because the required driving voltage is increased as the thickness of the transparent insulating layer is increased, in general, when the thickness of the transparent insulating layer 206 is increased by 0.5 micrometer each time, the maximum voltage in the driving voltage combination will be increased by 0.3 volt. When the thickness of the transparent insulating layer 206 is 1 to 3 micrometers, a smooth phase retardation curve can be better obtained without excessive increase of the driving voltage.

Embodiment 10

On the basis of any one of the embodiments 1 to 9, as illustrated in FIG. 3, a high-impedance layer material is filled into the spacing in each electrode group 205 except the strip electrodes 2051 to form a high-impedance layer 2052, so that the electric field between two adjacent strip electrodes 2051 can be uniformly varied, and hence the phase retardation curve can become smoother.

The high-impedance layer material may be a semiconductor material such as an indium gallium zinc oxide (IGZO) film and a polysilicon film. The high-impedance layer allows adjacent electrodes to produce a weak current due to the different voltage difference, and hence there is a voltage at an interval region between adjacent electrodes and the voltage can be uniformly and progressively varied, namely the electric field can be uniformly varied. For instance, as for a 13.3-inch display device, if each electrode group includes 4 strip electrodes, the voltages of which are 0.2V, 1.9V, 3.0V and 5.4V in sequence, as for electrodes respectively applied with the voltages of 1.9V and 3.0V, in the case of no high-impedance layer being provided, the voltage drops of the interval regions close to the positions at high voltages are great, and the voltage drops of the interval regions close to the positions at low voltages are small; and the equidistant measurement results of the positions between the electrode applied with the voltage of 1.9V and the electrode applied with the voltage of 3.0V are as follows: 3.0V, 2.6V, 2.3V, 2.1V, 2.0V and 1.9V. In the case of the high-impedance layer being provided, the voltages of the interval regions are equidistantly varied; and the equidistant measurement results of the positions between the electrode applied with the voltage of 1.9V and the electrode applied with the voltage of 3.0V are as follows: 3.0V, 2.9V, 2.8V, 2.7V, 2.6V, 2.5V, 2.4V, 2.3V, 2.2V, 2.1V, 2.0V and 1.9V.

Moreover, the width of the high-impedance layers 2052 is greater than or equal to that of the sub-pixels 101, and hence the problem of 3D display crosstalk can be reduced.

Embodiment 11

The electrically-driven LC lens provided by the embodiment of the present invention will be described below with reference to a specific example.

For instance, as for a 13.3-inch, 293.76*165.24 mm LCD device, the specification of sub-pixels thereof is 51 micrometers. In this case, the thickness of indium tin oxide (ITO) strip electrodes may be 1,000 Å. As the length of the ITO electrodes is greater than 165.24 mm, the resistance of the ITO electrodes can be reduced when the thickness of the ITO electrodes is increased, and hence the problem of signal delay generated by an overlong length can be reduced. Currently, the width of the ITO electrodes may be as small as 3.5 micrometers. But the risk of short current can be produced by ITO residual due to a small width as well as a long length, so that a large width is selected as much as possible. As for the above exemplary product, if each electrode group includes 4 second electrodes which are parallel to each other and are strip electrodes sequentially arranged from left to right, when the strip electrodes have the width of 7.29 micrometers and have an equal spacing, and the liquid crystal material of KW2-306 model produced by Shijiazhuang Chengzhi Yonghua Display Materials Co., Ltd. ("Chengzhi Yonghua") is adopted, in order to obtain a smooth phase retardation curve, preferably, the voltages of the strip electrodes may be 0.2V, 1.9V, 3.0V and 5.4V in sequence. If each electrode group includes 5 second electrodes which are also parallel to each other and are strip electrodes sequentially arranged from left to right, when the strip electrodes have the width of 5.67 micrometers and have an equal spacing, and the liquid crystal material of KW2-306 model produced by Chengzhi Yonghua are adopted, in order to obtain a smooth phase retardation curve, the voltages of the strip electrodes are 0.2V, 1.9V, 2.4V, 3.2V and 5.4V in sequence. If each electrode group includes 6 second electrodes which are also parallel to each other and are strip electrodes sequentially arranged from left to right, when the strip electrodes have the width of 4.64 micrometers and have an equal spacing, and the liquid crystal material of KW2-306 model produced by Chengzhi Yonghua are adopted, in order to obtain a smooth phase retardation curve, the voltages of the strip electrodes are 0.2V, 1.2V, 1.7V, 2.3V, 3.2V and 5.5V in sequence. If each electrode group includes 7 second electrodes which are also parallel to each other and are strip electrodes sequentially arranged from left to right, when the strip electrodes have the width of 3.92 micrometers and have an equal spacing, and the liquid crystal material of KW2-306 model produced by Chengzhi Yonghua are adopted, in order to obtain a smooth phase retardation curve, the voltages of the strip electrodes are 0.2V, 1.2V, 1.6V, 1.9V, 2.6V, 3.2V and 5.5V in sequence.

If the number of the strip electrodes in each electrode group is 3 or 4, the phase retardation curve will be not smooth enough, and hence the problem of 3D display crosstalk can be incurred. The reason of the fact that the phase retardation curve is not smooth enough is that: the width of the ITO electrodes is increased in such a way that the electric field in the electrode group unit is not uniform and not progressively distributed, and hence the alignment of liquid crystal molecules cannot be varied from the horizontal direction of a major axis to the vertical direction of the major axis sequentially. Therefore, as for the 13.3-inch LCD device, the number of the strip electrodes in each electrode group is preferably 4, 5, 6 or 7, and more preferably, 4.

The electrically-driven LC lens provided by the embodiment of the present invention can be applied to an LCD device of any size, and the corresponding number and the corresponding width of the electrodes can be determined by the process capability and the simulated phase retardation curve. For instance, as for a 55-inch LCD device, the size of sub-pixels thereof is 210 micrometers, and hence the number of electrodes is optionally 10 to 30. Of course, the problem that drive circuits become more complex and the cost become higher due to the increased number of electrodes must be also considered in large-size products, so that reasonable number of electrodes must be selected by taking consideration into all aspects equally.

Further description will be given below regarding how to achieve 3D display by the voltage setting of the strip electrodes.

Figure 4:
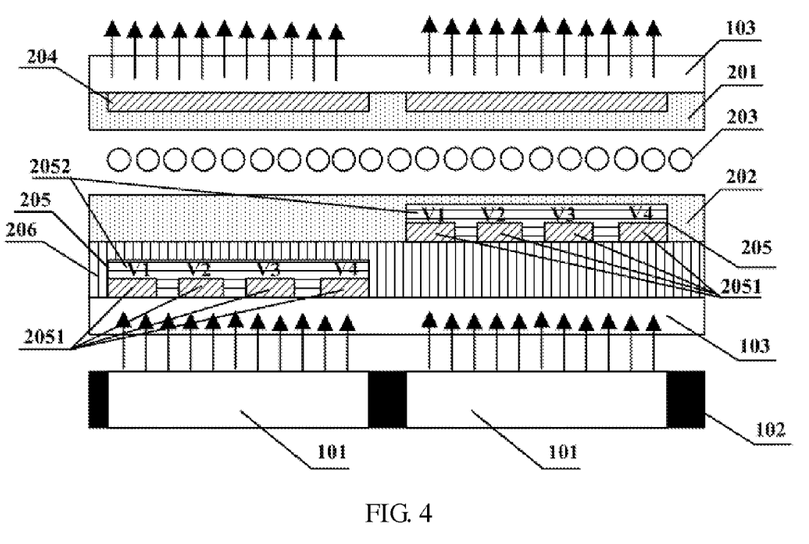
FIG. 4 is a schematic state diagram of the electrically-driven LC lens provided by the embodiment of the present invention where the voltages of the strip electrodes are equal to one another.

As illustrated in FIG. 4, if the voltages of 4 strip electrodes 2051 in each electrode group 205 are that: V1=V2=V3=V4, the voltages may be set to be 0 or not to be 0 as long as the voltages are equal. In this case, light emitted from the display panel cannot be deflected after passing through the LC lens, so that two eyes of the user can view the displayed image, and hence a 2D image can be presented.

Figure 5A:
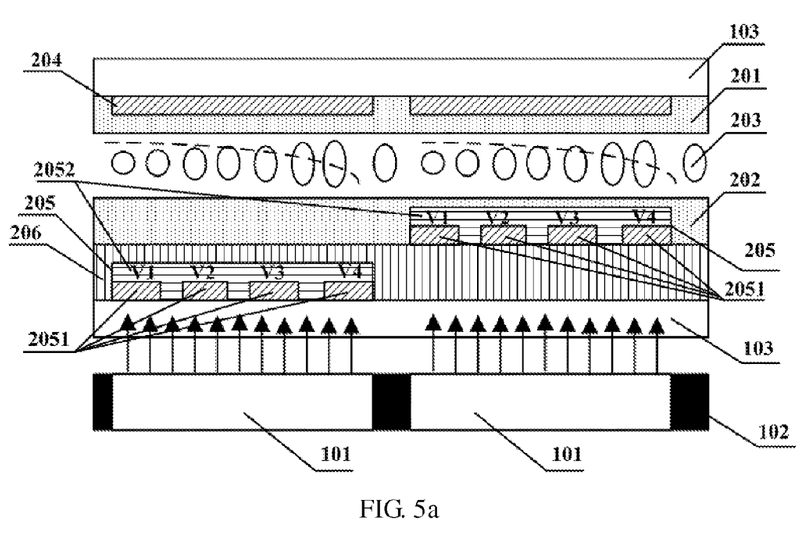
FIG. 5a is a schematic state diagram of the electrically-driven LC lens provided by the embodiment of the present invention when the voltages of the strip electrodes are progressively increased from left to right.
Figure 5B:
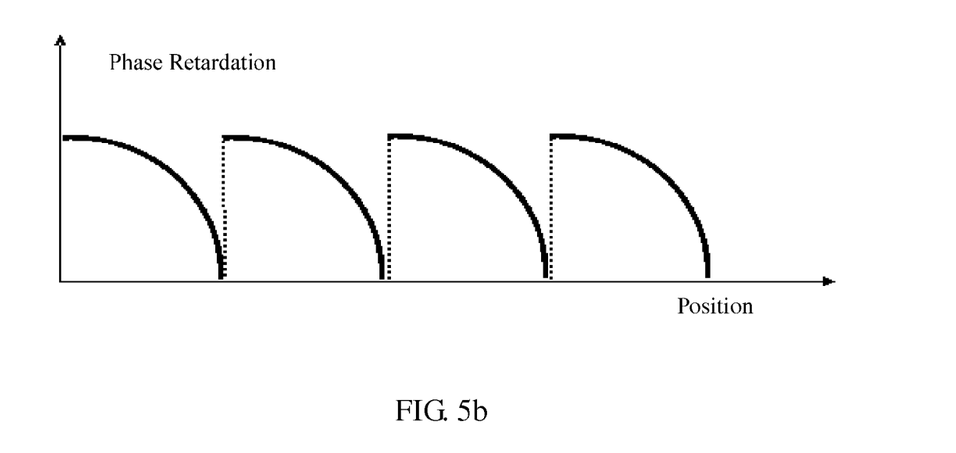
FIG. 5b is a phase retardation curve of the electrically-driven LC lens provided by the embodiment of the present invention when the voltages of the strip electrodes are progressively increased from left to right.
Figure 5C:
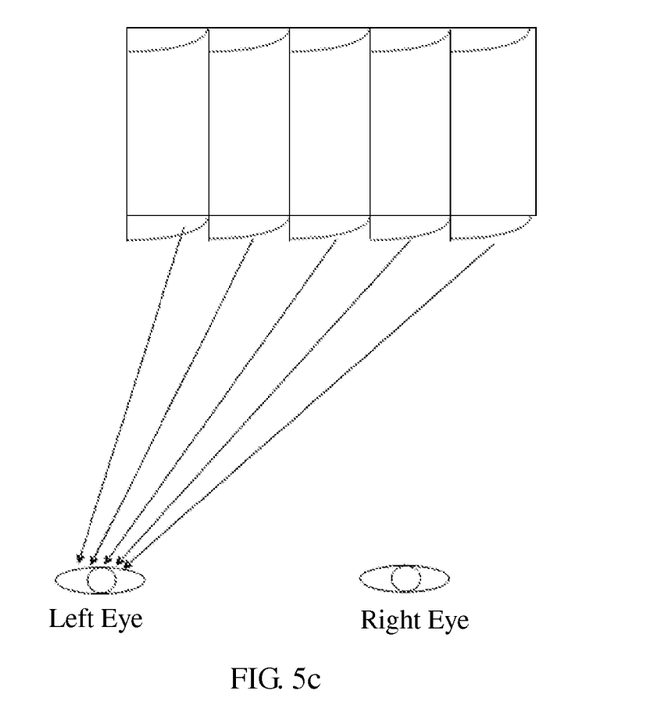
FIG. 5c is a schematic diagram of optical paths viewed by a human eye, when the voltages of the strip electrodes are progressively increased from left to right, in the embodiment of the present invention.

As illustrated in FIG. 5a, if the voltages of the 4 strip electrodes 2051 in each electrode group 205 adopt the first setting: V1<V2<V3<V4, the liquid crystal molecules are rotated to different angles due to different driving voltages to form phase retardation as shown in FIG. 5b. In this case, light emitted from the display panel will be deflected after passing through the LC lens, and hence the left eye of the human being can view the currently displayed image, as illustrated in FIG. 5c.

Figure 6A:
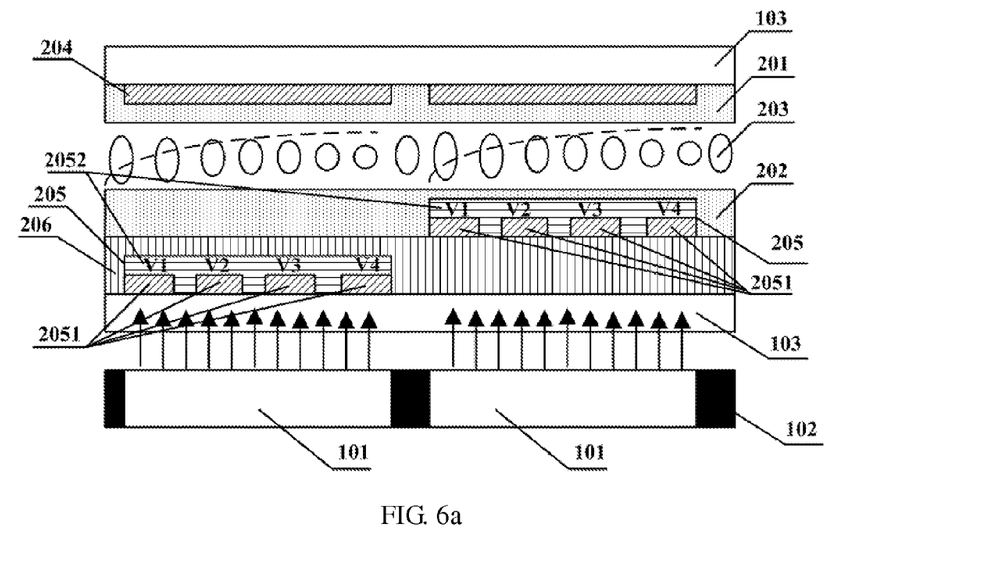
FIG. 6a is a schematic state diagram of the electrically-driven LC lens provided by the embodiment of the present invention when the voltages of the strip electrodes are progressively decreased from left to right.
Figure 6B:
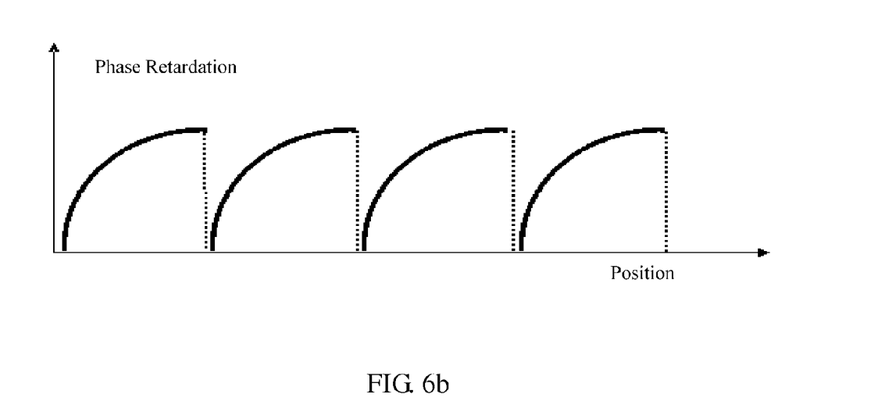
FIG. 6b is a phase retardation curve of the electrically-driven LC lens provided by the embodiment of the present invention when the voltages of the strip electrodes are progressively decreased from left to right.
Figure 6C:
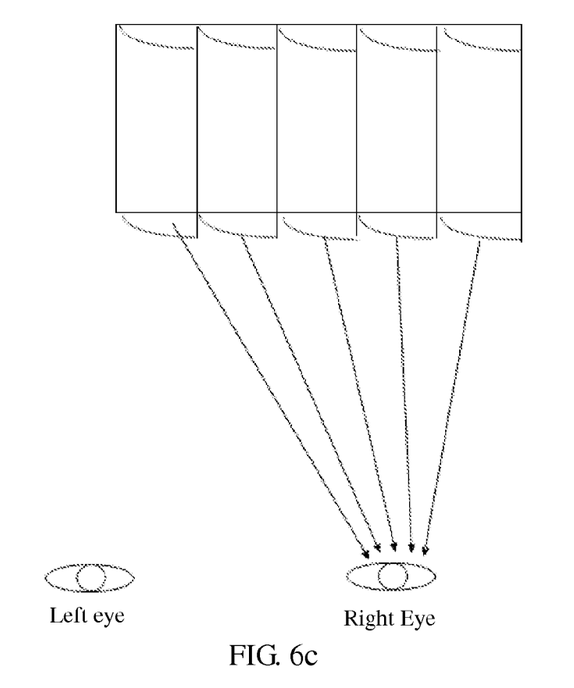
FIG. 6c is a schematic diagram of optical paths viewed by a human eye, when the voltages of the strip electrodes are progressively decreased from left to right, in the embodiment of the present invention.

As illustrated in FIG. 6a, if the voltages of the 4 strip electrodes 2051 in each electrode group 205 adopts the second setting: V1>V2>V3>V4, the liquid crystal molecules are rotated to different angles due to different driving voltages to form phase retardation as shown in FIG. 6b. In this case, light emitted from the display panel will be deflected after passing through the LC lens, and hence the right eye of the human being can view the currently displayed image, as illustrated in FIG. 6c.

More specifically, at the T1 moment, V1=V2=V3=V4=0V; at the T2 moment, V1=0.2V, V2=1.9V, V3=3.0V, and V4=5.4V; and at the T3 moment, V1=5.4V, V2=3.0V, V3=1.9V, and V4=0.2V. The voltage of each electrode must be determined by the width and the spacing of the ITO electrodes, the thickness of the liquid crystal layer, the viscosity and the dielectric constant of the liquid crystal material and the like. For instance, as for a 13.3-inch LCD device, both the width and the spacing of strip electrodes are 7.29 micrometers; the thickness of a liquid crystal layer is 27 micrometers; the viscosity of the liquid crystal material is 233 mpa·s; and the dielectric constant is 8.3.

When the switching frequency of the first setting and the second setting reaches 60 Hz, 120 Hz or higher frequency, a 3D display image with depth of field information will be sensed by the human brain from the left-eye image and the right-eye image viewed by the human eyes at different moments due to the persistence-of-vision effect and the parallax effect of the human eyes.

An embodiment of the present invention further provides a display device, which comprises the electrically-driven LC lens provided by the embodiment of the present invention and a display panel. The display panel is, for instance, an LCD panel, an OLED display panel, an e-paper display panel or the like. The electrically-driven LC lens is disposed on the light-emitting side of the display panel. The electrically-driven LC lens and the display panel are provided with a pixel array respectively, and the pixel arrays thereof correspond to each other.

Figure 7:
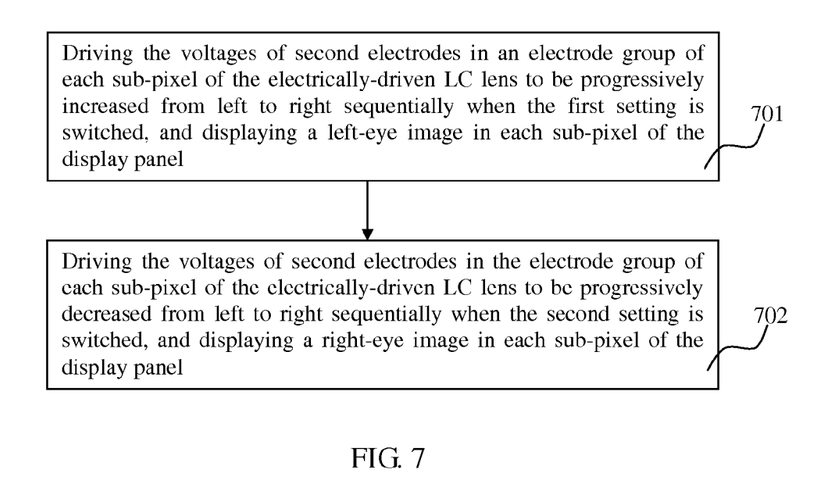
FIG. 7 is a flowchart of a 3D liquid crystal display method provided by an embodiment of the present invention.

An embodiment of the present invention further provides a 3D display method. The method is achieved by the display device provided by the embodiment of the present invention. As illustrated in FIG. 7, the method may be conducted as follows.

Step S701: driving the voltages of second electrodes in an electrode group of each sub-pixel of the electrically-driven LC lens to be progressively increased from left to right sequentially when the first setting is switched, and displaying a left-eye image in each sub-pixel of the display panel. At this point, the left eye of a user watches the left-eye image from the display device.

Step S702: driving the voltages of second electrodes in the electrode group of each sub-pixel of the electrically-driven LC lens to be progressively decreased from left to right sequentially when the second setting is switched, and displaying a right-eye image in each sub-pixel of the display panel. At this point, the right eye of the user watches the right-eye image from the display device.

The switching frequency of the first setting and the second setting is greater than or equal to a set value (e.g., 60 Hz). The first setting and the second setting respectively correspond to the moments for displaying the left-eye image and the moments for displaying the right-eye image.

In general, in order to achieve better 3D display effect, the set value is preferably greater than 60 Hz. For instance, the set value may also be 120 Hz.

Embodiments of the present invention provide an electrically-driven LC lens, a display device and a 3D liquid crystal display method. In the electrically-driven LC lens, each sub-pixel is provided with an electrode group which is arranged opposite to a first electrode; each electrode group includes a plurality of second electrodes; and where the voltages of the second electrodes in each electrode group are progressively increased or decreased from left to right sequentially, light passing through the sub-pixels is deflected to different directions, and hence corresponding sub-pixels of the display panel are respectively viewed by the left eye or the right eye of the user. In this case, a left-eye image and a right-eye image are temporally alternately displayed, so that the left eye and the right eye can respectively view images at different moments without reduced resolution, and hence the resolution of 3D liquid crystal display can be improved.

The foregoing is only the preferred embodiments of the present invention and not intended to limit the scope of protection of the present invention. The scope of protection of the present invention should be defined by the appended claims.

The invention claimed is:

1. An electrically-driven liquid crystal (LC) lens, comprising:
    first electrodes, a plurality of electrode groups arranged corresponding to respective sub-pixels, and a liquid crystal layer disposed between the first electrodes and the electrode groups, wherein each electrode group includes a plurality of second electrodes; and where the voltages of the second electrodes in each electrode group are progressively increased or decreased from left to right sequentially, light passing through the sub-pixels is deflected to different directions;
    wherein adjacent electrode groups are disposed in different layers.

2. The electrically driven LC lens according to claim 1, wherein the plurality of second electrodes in each electrode group are strip electrodes which are parallel to each other and sequentially arranged from left to right.

3. The electrically driven LC lens according to claim 2, wherein each electrode group includes 2 to 30 strip electrodes.

4. The electrically driven LC lens according to claim 2, wherein widths of the strip electrodes in each electrode group are equal.

5. The electrically driven LC lens according to claim 2, wherein spacing between the strip electrodes in each electrode group is equal.

6. The electrically driven LC lens according to claim 1, wherein spacing between adjacent electrode groups is less than or equal to a set value.

7. The electrically driven LC lens according to claim 1, wherein the liquid crystal layer includes:
    an upper alignment layer, a lower alignment layer, and liquid crystal filled between the upper alignment layer and the lower alignment layer; and
    the first electrodes are disposed in the upper alignment layer and the electrode groups are disposed in the lower alignment layer.

8. The electrically driven LC lens according to claim 1, further comprising:
    a transparent insulating layer disposed beneath the lower alignment layer; and adjacent electrode groups are respectively disposed in the lower alignment layer and the transparent insulating layer.

9. The electrically driven LC lens according to claim 8, wherein a thickness of the transparent insulating layer is 0.5 to 10 micrometers.

10. The electrically driven LC lens according to claim 9, wherein a thickness of the transparent insulating layer is 1 to 3 micrometers.

11. The electrically driven LC lens according to claim 1, wherein a high-impedance layer material is filled into spacing in each electrode group except the strip electrodes to form a high-impedance layer.

12. The electrically driven LC lens according to claim 11, wherein a width of the high-impedance layer is greater than or equal to that of the sub-pixel.

13. A display device, comprising the electrically-driven LC lens according to claim 1 and a display panel, sub-pixels of the electrically-driven LC lens corresponding to sub-pixels of the display panel.

14. The display device according to claim 13, wherein spacing between adjacent electrode groups in each sub-pixel of the electrically-driven LC lens is less than or equal to a width of a black matrix between each sub-pixel in the display panel.

15. A 3D display method employing the display device according to claim 13, comprising:
   driving voltages of second electrodes in an electrode group of each sub-pixel of the electrically-driven LC lens to be progressively increased from left to right sequentially when a first setting is switched, and displaying a left-eye image in each sub-pixel of the display panel; and
   driving the voltages of second electrodes in an electrode group of each sub-pixel of the electrically-driven LC lens to be progressively decreased from left to right sequentially when a second setting is switched, and displaying a right-eye image in each sub-pixel of the display panel, wherein
   a switching frequency of the first setting and the second setting is greater than or equal to a set value.

16. The electrically driven LC lens according to claim 2, wherein the liquid crystal layer includes:
   an upper alignment layer, a lower alignment layer, and liquid crystal filled between the upper alignment layer and the lower alignment layer; and
   the first electrodes are disposed in the upper alignment layer and the electrode groups are disposed in the lower alignment layer.

17. The electrically driven LC lens according to claim 2, further comprising:
   a transparent insulating layer disposed beneath the lower alignment layer; and adjacent electrode groups are respectively disposed in the lower alignment layer and the transparent insulating layer.

18. The electrically driven LC lens according to claim 2, wherein a high-impedance layer material is filled into spacing in each electrode group except the strip electrodes to form a high-impedance layer.

* * * * *